United States Patent
Tomiyama

[15] 3,675,366
[45] July 11, 1972

[54] REMOTELY CONTROLLABLE TOY TRANSPORTER FOR VEHICLES

[72] Inventor: Eijiro Tomiyama, Tokyo, Japan
[73] Assignee: Tomy Kogyo Co., Ltd., Tokyo, Japan
[22] Filed: April 5, 1971
[21] Appl. No.: 131,100

[52] U.S. Cl. .......................................................46/244 A
[51] Int. Cl. ......................................................A63h 33/26
[58] Field of Search ..........................46/202, 244 R, 244 A

[56] References Cited

UNITED STATES PATENTS

| | | | |
|---|---|---|---|
| 2,679,712 | 6/1954 | Schwien et al. | 46/244 |
| 2,846,813 | 8/1958 | Giardina | 46/244 |
| 3,363,362 | 1/1968 | Jolley | 46/244 |
| 3,589,058 | 6/1971 | Labat | 102/95 |
| 3,594,951 | 7/1971 | Perhacs | 46/244 |

*Primary Examiner*—Louis G. Mancene
*Assistant Examiner*—Robert F. Cutting
*Attorney*—Toren & McGeady

[57] ABSTRACT

An electrically actuated and remotely controllable toy transporter for vehicles which comprises, in combination, a tractor trailer unit, a trailer adapted to travel with, or trail behind, the tractor trailer unit, and a manually operable electric remote-control device for remotely controlling the tractor and/or the trailer. One of the principal features of the present toy consists in that the trailer can be hooked up with and unhooked from the tractor by manipulation of the remote-control device. Also, another principal feature is that the trailer is equipped with electrically actuated and remotely controllable means for loading and unloading the vehicles.

9 Claims, 9 Drawing Figures

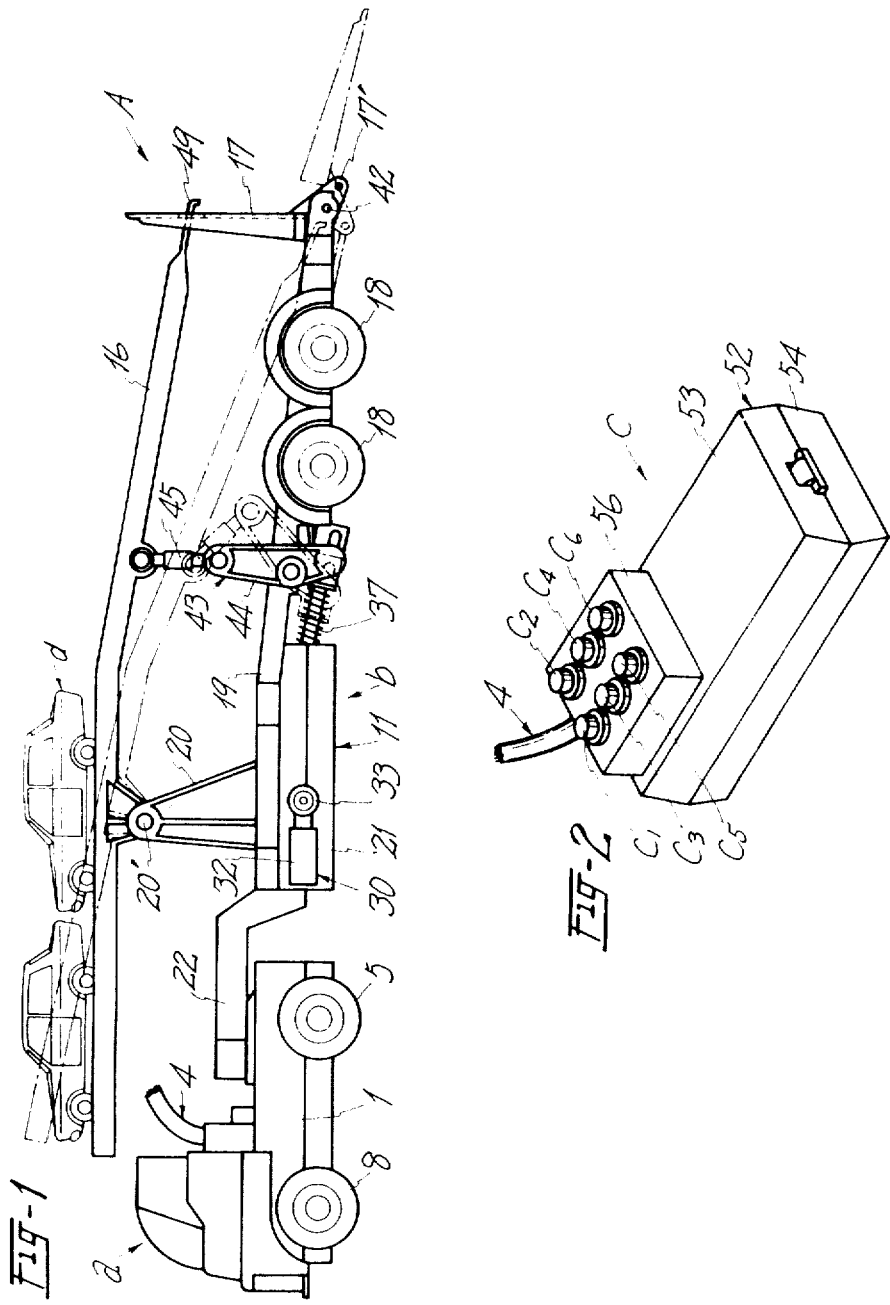

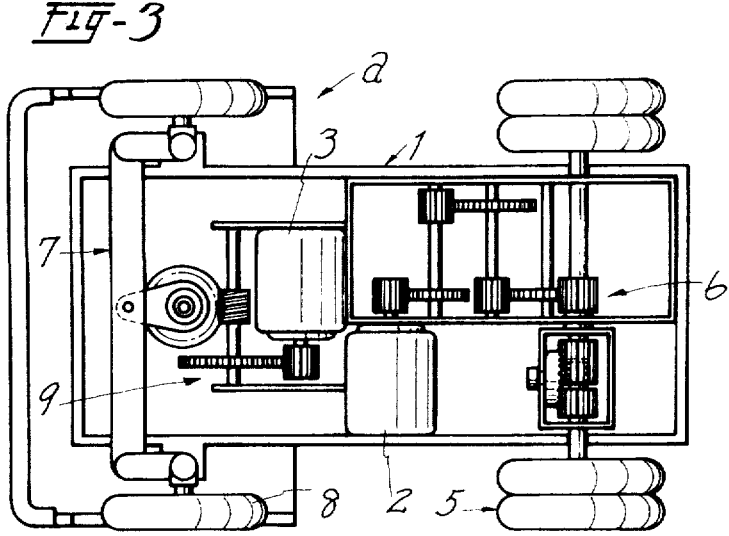
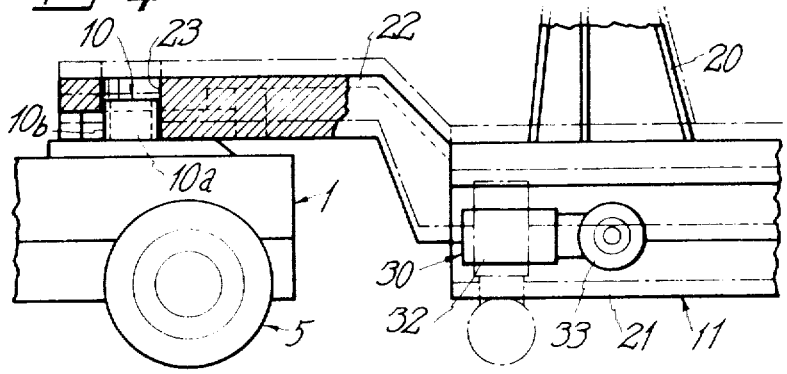
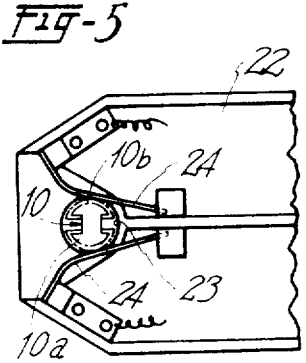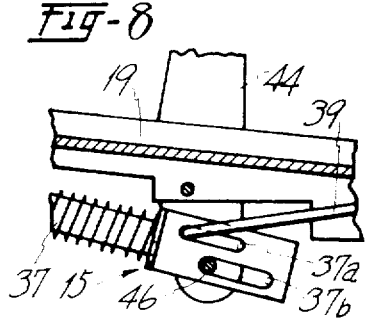

INVENTOR.
EIJIRO TOMIYAMA

BY Toren and McGrady
ATTORNEYS

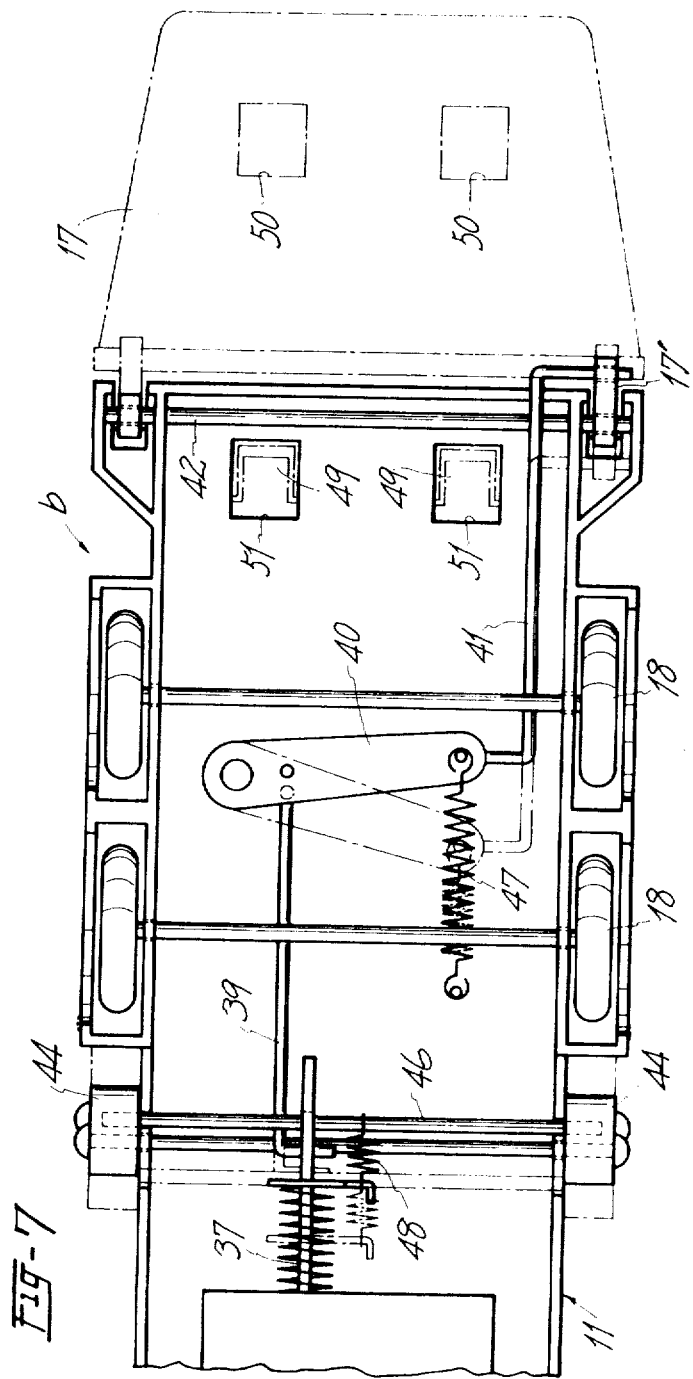

REMOTELY CONTROLLABLE TOY TRANSPORTER FOR VEHICLES

SUMMARY OF THE INVENTION

This invention relates to a remotely controllable toy vehicle, and more particularly to an electrically operated and remotely controllable toy transporter for vehicles.

Electrically operated toy vehicles of this kind which are arranged to be remotely steered and/or to be remotely controlled for reverse travel as well as forward travel by manipulation of a manually operable remote-control device are known, but most of these vehicles do not effect more remarkable playing functions than those conventional functions.

It is therefore the principal object of the present invention to provide an electrically operated and remotely controllable toy vehicle of a vehicle-transporter type which is capable of affording more versatile playing effects than those of conventional toy vehicles of this type.

Another object of the present invention is to provide an electrically operated and remotely controllable toy vehicle of the type described which comprises a tractor trailer unit, a trailer adapted to travel with the tractor trailer unit, and a manually operable remote-control device adapted to remotely control functions of the unit and trailer, and which is permitted, by manipulation of the remote-control device, not only a remote control of the above-mentioned conventional playing functions but also a remote control of additional playing functions such as coupling the tractor trailer unit with the trailer, and releasing the former from the latter.

A further object of the present invention is to provide a toy trailer transporter for vehicles arranged to be releasably coupled with an electric motor-driven tractor trailer unit so as to travel with or trail behind the latter, and having a mechanism to be remotely controlled for loading and unloading the vehicles.

The foregoing and more specific objects, features and advantages of the present invention will become apparent upon reading the following detailed description of the invention in conjunction with the accompanying drawings in which:

FIG. 1 is a schematic side view of an electrically operated and remotely controllable toy transporter for vehicles embodying the present invention, from which a remote-control device has been cut away;

FIG. 2 is a perspective view of one example of a remote-control device for remotely controlling the toy transporter shown in FIG. 1;

FIG. 3 is a bottom plan view, on an enlarged scale, of the tractor trailer unit shown in FIG. 1, illustrating the internal mechanisms thereof;

FIG. 4 is a partially broken-away side view, on an enlarged scale, of a portion of the toy transporter shown in FIG. 1, illustrating the manner in which the trailer is hooked up with and unhooked from the tractor trailer unit;

FIG. 5 is a partially broken-away bottom plan view, on an enlarged scale, of a front portion of the trailer;

FIG. 7 is a partially broken-away bottom plan view, on an enlarged scale, of the trailer, illustrating the operative parts thereof;

FIG. 8 is a fragmentary view, on an enlarged scale, of an operative part for imparting movement to a mechanism of the trailer.

In the drawings like portions or parts are designated with like reference numerals or characters.

Figure 6:
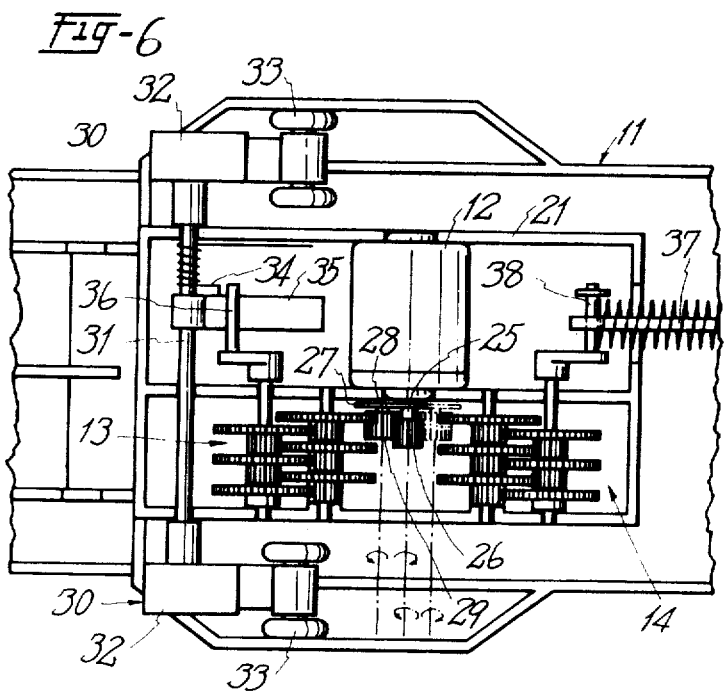
FIG. 6 is a partially broken-away bottom plan view, on an enlarged scale, of the trailer, illustrating the internal mechanisms thereof.
Figure 9:
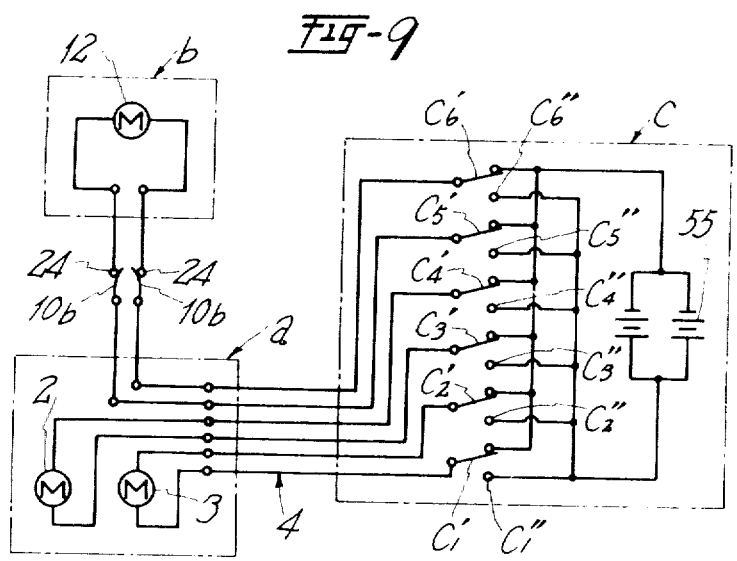
FIG. 9 is a schematic circuit diagram of the toy transporter.

In one aspect of the present invention, the electrically operated and remotely controllable toy transporter for vehicles, indicated by A comprises, in combination, a tractor trailer unit $a$, a trailer $b$ adapted to travel with, or trail behind, the tractor trailer unit $a$, and a manual remote-control device $c$ for remotely controlling functions of the tractor trailer unit $a$ and the trailer $b$.

The tractor trailer unit $a$ comprises a vehicle body 1 equipped with a first reversible electric motor 2 and a second reversible electric motor 3. These two motors 2 and 3 are electrically connected to the manual remote-control device $c$ by way of a generally cable-shaped remote-control connection 4, respectively so that they can be remotely controlled by manipulation of the remote-control device $c$.

The first motor 2 is for driving the tractor trailer unit $a$ forward and backward and is operatively connected with the rear driving wheel assembly 5 through the medium of a first gear arrangement, generally designated at 6. On the other hand, the second motor 3 is for steering the unit $a$ and is in driving connection with a steering mechanism 7 of the front wheel set 8 of the unit through the medium of a second gear arrangement, denoted by 9.

Indicated by reference numeral 10 is a coupling device which projects upwardly from the upper surface of the tractor body 1 at a portion adjacent the rear end thereof and which is arranged to connect and disconnect the tractor trailer unit $a$ and the trailer $b$ as will be discussed later. The coupling device 10 comprises a generally cylindrical body 10a of insulating material and a pair of generally semi-circular electrical contacts 10b which are mounted on the periphery of the cylindrical body 10a in spaced-apart, opposed relationship. The contacts 10b are each connected in circuit with the remote-control device $c$ through the remote-control connection 4 for the purposes which will be described later.

The trailer $b$ comprises a trailer body 11, a third reversible electric motor 12 mounted therein, a third gear arrangement 13 arranged to be driven by the third motor 12, a fourth gear arrangement 14 arranged to be driven by the third motor 12, a mechanism 15 operatively engaged with the fourth gear arrangement 14, a top ramp 16 for loading toy vehicles $d$, arranged to be rotated about a horizontal axis within a predetermined angular range and operatively connected to the mechanism 15, a tale gate 17 pivotally mounted on the rear end of the body 11 and arranged to be operated synchronously with the top ramp 16, and two pairs of rear wheel assemblies 18.

The trailer body 11 comprises a longitudinally elongated rectangular frame 19 so constructed as to receive thereon toy vehicles $d$, a pair of transversely spaced upstanding supports 20 pivotally supporting the top ramp 17, a gear casing 21 in which the third motor 12 and the third and fourth gear arrangements 13 and 15 are mounted and an extension 22 projecting forwardly from the front end of the frame 20. This forwardly projecting extension 22 is provided, at its front end portion, with a circular opening 23 which is adapted to receive the coupling device 10 of the tractor body 1 to thereby connect the tractor trailer unit $a$ and the trailer $b$.

As clearly shown in FIG. 5, a pair of electrical spring contacts 24 are attached to the underside of the extension 22 at a portion adjacent to the front end thereof in such a way that when the coupling device 10 is inserted in the circular opening 23 the semi-circular electrical contacts 10b of the coupling device 10 are brought into contact with the spring contacts 24, respectively. These spring contacts 24 are each connected in circuit with the third reversible electric motor 12. This motor 12 is provided with an output shaft 25 on which a pinion 26 is fixedly mounted and on which a supporting arm 27 is rotatably mounted. The supporting arm 27 carries a shaft 28 which rotatably supports a planet gear wheel 29. This planet gear 29 is in meshed engagement with the output pinion 26 of the third motor 12 and is adapted to be brought into engagement with the third gear arrangement 13 or with the fourth gear arrangement 14, according to the direction of rotation of the third motor 12, for the purposes which will be described later.

Indicated by numeral 30 is a supporting wheel assembly which is mounted on the trailer body 11 at a portion adjacent the forwardly projecting extension 22 thereof. As clearly shown in FIG. 6, the supporting wheel assembly 30 comprises a rotatable shaft 31 extending transversely across the gear casing 21, a wheel-supporting leg 32 secured to each end of the rotatable shaft 31 and rotatably carrying a supporting wheel 33, a spring 34 for constantly urging the rotatable shaft 31 in one rotational direction, and an arm 35 secured at one end to an intermediate portion of the rotatable shaft 31. The arm 35 is always kept in pressure contact with a crank pin 36, which is operatively connected to the third gear arrangement 13 for rotational movement, by the action of the spring 34.

The operating mechanism 15 for synchronously operating both the top ramp 16 and the tale gate 17 comprises a first operating rod 37 extending longitudinally of the body 11 and pivotally connected at one end to a crank pin 38, which is operatively engaged with the fourth gear arrangement 14, so that it can be imparted reciprocation, a second operating rod 39 connected at a bent end thereof to the other end of the first rod 37 by insertion of the bend into a longitudinally extending slot 37a formed in the other end of the first rod 37 as is best seen in FIG. 8, a link member 40 pivoted at one end to the underside of the body 11 and to the other bent end of the second rod 39 at a portion adjacent to the pivot, a third operating rod 41 pivoted at one end to the other end of the link member 40 and eccentrically pivoted at the other end to one of the lugs 17' projecting from the base portion of the tale gate 17 and rotatably mounted on a stationary shaft 42 fixed to the rear end of the body 11 transversely thereof, and a link work 43 operatively connecting the first rod 37 and the top ramp 16.

The link work 43 comprises first link members 44 each being pivoted to each side of the rectangular frame 19, second link members 45 each being pivotally connected at its lower end to the upper end of each first link member 44 and at its upper end to each side of the top ramp 16, and a connecting rod 46 connecting the lower ends of the first link members 44 and extending transversely through a slot 37b longitudinally formed in the rear end of the first operating rod 37.

Indicated by numerals 47 and 48 are tension springs which constantly forwardly biases the link member 40 and the connecting rod 46, respectively, for the purposes which will be discussed later. Numeral 49 indicates a pair of tongue-like lugs which project rearwardly from the rear end of the top ramp 16 and which are designed to be inserted in the mating apertures 50 formed in the tale gate 17 when the tale gate is erected by being rotated. Numeral 51 shows a pair of similar apertures which are formed in the rear end portion of the body 11 and which receive therein the lugs 49 when the rear end of the top ramp 16 is lowered by the pivotal movement thereof about the pivot 20'.

The remote-control device, indicated as a whole by $c$ in FIG. 2, comprises a battery housing 52 composed of upper and lower housing portions 53 and 54 which accommodates dry cell batteries 55, and a switch housing 56 mounted on the upper housing portion 53 and equipped with push button switch means, generally designated by $s$. In the illustrated embodiment, the switch means $s$ comprises six push buttons $c1$, $c2$, $c3$, $c4$, $c5$ and $c6$ which actuate respective contact springs $c1'$, $c2'$, $c3'$, $c4'$, $c5'$ and $c6'$. These springs are brought into contact with respective contacts $c1''$, $c2''$, $c3''$, $c4''$, $c5''$ and $c6''$ when the respective push buttons are manually depressed, thereby closing the respective motor circuits which will be explained later.

Description will now be directed to manner of operation of the toy transporter A according to the present invention.

When the first push button $c1$ is depressed, the contact spring $c1'$ is brought into contact with the mating contact $c1''$ whereby the circuit for the second motor 3 is closed and the motor is caused to rotate in one rotational direction and transmits its drive power to the steering mechanism 7 through the second gear arrangement 9, thus turning the front wheels 8 of the tractor trailer unit $a$ left. On the other hand, as the second push button $c2$ is depressed, the contact spring $c2'$ comes into contact with its mating contact $c2''$ to thereby cause a polarity reversal of the current supplied to the second motor 3 whereby the direction of rotation of the motor is reversed, thus causing the front wheels 8 to be turned right.

An alternate depression of the third and fourth push buttons $c3$ and $c4$ controls the forward or reverse travel. In the illustrated embodiment, actuation of the fourth push button $c4$ controls the forward travel and actuation of the third push button $c3$ controls the reverse travel. More specifically, when the fourth push button $c4$ is depressed, contact spring $c4'$ is brought into contact with its mating contact $c4''$ to make the circuit for the first motor 2 whereby the motor is caused to rotate in one direction of rotation and its drive power is transmitted to the rear driving wheel assembly 5 through the first gear arrangement 6 to cause the rear wheels to be rotated counter-clockwise, thus driving the unit $a$ forward.

On the other hand, when the third push button $c3$ is depressed, a polarity reversal of the current supplied to the first motor 2 is caused by contacting of contact spring $c3'$ with the mating contact $c3''$ whereby the rotational direction of the motor is reversed to cause the rear wheels to be rotated clockwise, thus reversing the traveling direction of the unit $a$.

It goes without saying that when the trailer $b$ is hooked up with the tractor trailer unit $a$, the former travels with the latter in a direction in which the latter travels. Next, description will be made as to how the trailer $b$ is hooked up with and unhooked from the tractor trailer unit $b$ by remote-control by referring to the drawings, particularly in FIGS. 1, 2, 4 and 5.

When it is desired to unhook the trailer $b$ from the tractor trailer unit $a$ in the position illustrated in FIG. 1, the fifth push button $c5$ must be manually depressed. The depression of the fifth push button brings contact spring $c5'$ into contact with the mating contact $c5''$ to close the circuit for the third motor 12. When this circuit is thus made, the motor 12 starts rotating clockwise as viewed from FIG. 6 and transmits its rotational force to crank pin 36 of the crank for rotational movement in the counter-clockwise direction through the third gear arrangement 13. Then, as the crank pin 36 rotates in that direction, the arm 35 which is urged by the spring 34 to rotate in the clockwise direction and which is in pressure contact the crank pin 36 is permitted to rotate in that direction with the supporting wheel assembly 30 (when viewed from FIGS. 1 and 4, this wheel assembly rotates in the clockwise direction) by the action of the spring 34 until the wheel assembly is rotated to the position illustrated by the phantom lines in FIG. 4, i.e., an angle of about 90°.

When the supporting wheels 33 are lowered and assume the position illustrated by the phantom lines in FIG. 4, the forward portion of the trailer $b$ is raised by the wheels and assumes the position indicated by the phantom lines. As the forward portion of the trailer $b$ assumes such position, the trailer is in a position to be unhooked from the tractor trailer unit $a$, since, in the illustrated position the coupling device 10 of the unit $a$ is disengaged from the circular opening 23 formed in the forwardly projecting extension 22 of the trailer $b$. Accordingly, when the tractor trailer unit $a$ is moved forward in the illustrated position by actuating the fourth push button $c4$ of the remote-control unit $c$, the trailer $b$ is released completely from and left behind the tractor trailer unit $a$.

When it is desired to hook up the trailer $b$ with the tractor trailer unit $a$ after the former has been unhooked from the latter in the just-mentioned manner, the unit $a$ is first reversed by depressing the third push button $c3$ until the coupling device 10 assumes the position for engaging the circular aperture 23 of the extension 22. In this case, the first push button $c1$ and/or the second push button $c2$ is depressed for the steering purpose, when necessary. Then, when the coupling device 10 has assumed such position, the fifth push button $c5$ is depressed, so that the supporting wheels 33 are raised and the forward portion of the trailer $b$ is lowered, thereby causing the upwardly projecting joint 10 to be inserted into the circular aperture 23 whereby the hooking operation is completed.

In this connection, it is to be noted that the supporting wheel assembly 30 is designed to be rotated only within a predetermined angular range and that radius of rotation of the wheel-supporting leg 32 is determined so that when the supporting wheels 33 are completely lowered, the forwardly projecting extension 22 of the trailer can be raised to the height or level at which the circular aperture 23 is exactly disengaged from the coupling 10.

It is to be also noted that in the position shown by the phantom lines in FIG. 4, the semi-circular electric contacts 10b of the coupling 10 are still in contact with the mating spring contacts 24 attached to the underside of the extension 22 of trailer b and that the spring contacts 24 are formed into the shape of a substantially V opening forwardly of the extension 22 so that the coupling 10 can be easily guided by the spring contacts into the position for insertion of it into the mating aperture 23.

In order to raise and lower the top ramp 16 and tale gate 17, it is only necessary to depress the sixth push button c6 of the remote-control device c. As the button c6 is depressed, contact spring c6' is brought into contact with its mating contact c6" to cause a polarity reversal of the current supplied to the third reversible motor 12 whereby the running direction thereof is reversed. When the third motor 12 starts rotating in the counter-clockwise direction as viewed from FIG. 6, the planet gear wheel 29 meshed with the output pinion 26 is brought into operative engagement with the fourth gear arrangement 14 whereby crank pin 38 of the crank operatively engaged with the gear arrangement is rotated in the clockwise direction, thus imparting reciprocation to the first operating rod 37 which is pivotally connected at one end to the crank pin 38.

When the first rod 37 is pulled by the crank pin 38, the first link members 44 of link work 43 which are pivoted to the side walls of frame 19 and which are operatively connected to the first rod 37 in the manner depicted in FIG. 8 are forwardly pulled by the first rod to pivot in the clockwise direction, and at the same time, the second operating rod 39 longitudinally slidably connected to the first rod 37 in the manner depicted in FIG. 8 is forwardly pulled thereby to cause the link 40, which is pivotally connected to the second rod 39, to pivot in the forward direction.

As shown in FIG. 1, when the first link members 44 are rotated in the clockwise direction, the top ramp 16 is pulled downwardly through the medium of the second link members 45 and is rotated in the clockwise direction about the pivot 20' until it assumes the position illustrated by the phantom lines in FIG. 1. In the meantime, the link 40 being forwardly pulled by the second rod 39 pulls the third operating rod 41 to cause the tale gate 17 to pivot in the clockwise direction about the shaft 42, so that the tale gate 17 is released out of engagement with the top ramp 16 by disengaging of the apertures 50 thereof from the rearwardly projecting tongue-like lugs 49. Thereupon, the tale gate 17 is completely lowered, thus assuming the position indicated by the phantom lines in FIG. 1. In the indicated position, the outer end of the tale gate 17 is in contact with a supporting surface, such as a floor.

If the sixth push button c6 is kept depressed, the top ramp 16 and the tale gate 17 which have been lowered are raised and returned to their original positions illustrated by the solid lines in FIG. 1, since continuous depression of the button c6 permits the crank pin 38 to be further rotated whereby the operating rods 37 and 41 are rearwardly pushed against the action of the springs 48 and 47, which serve to ensure synchronous operation of top ramp 16 and tale gate 17, and both the top ramp and the tale gate are caused to pivot in the counter-clockwise direction.

The toy vehicles d may be either the so-called mini-cars without motor which are easily available at toy shops or stores, or powered vehicles of relatively small type.

Preferably, the top ramp 16 is provided, on its upper surface, with means for preventing slippage of the vehicles loaded thereon so that during the travel of the transporter the vehicles loaded thereon will not fall off.

What is claimed is:

1. A remotely controllable toy transporter for vehicles comprising, in combination, a powered tractor trailer unit comprising a unit body having at a portion adjacent to the rear end thereof first coupling means with a pair of electric contacts, a trailer adapted to travel with said tractor and comprising a trailer body having therein a reversible motor and having at a portion adjacent to the front end thereof second coupling means adapted to be releasably engaged with the first coupling means, said trailer body also having in close proximity to said second coupling means a pair of electric contacts connected in circuit with said reversible motor and adapted to be brought into contact with the first-mentioned contacts, a manually operable remote-control device electrically connected to the first-mentioned contacts through flexible connecting leads so that when the two pairs of contacts are brought into contact with each other the motor circuit is formed, said trailer further comprising a rotatable supporting wheel assembly including a pair of transversely spaced rotatable supports rotatable about a horizontal axis within a predetermined angular range and being arranged to be brought into operative connection with the reversible motor for pivotal movement when the latter is rotated in one rotational direction, whereby when the motor is rotated in that direction by manipulation of said remote-control device during the contact of the first-mentioned contacts with the second-mentioned contacts, the forward portion of the trailer body is caused to be raised and lowered by said supporting wheel assembly, thus permitting the first and second coupling means to be coupled with and uncoupled from each other.

2. A remotely controllable toy transporter as set forth in claim 1, wherein said trailer further comprises a top ramp for carrying vehicles, a pair of transversely spaced supports projecting upwardly from the trailer body and pivotally supporting the top ramp, a mechanism operatively connected with the top ramp for operation thereby to impart pivotal movement to the top ramp, said mechanism being arranged to be brought into operative connection with the reversible motor for operation when the latter is rotated in the other rotational direction by manipulation of the remote-control device.

3. A remotely controllable toy transporter as set forth in claim 2, wherein said trailer still further comprises a tale gate for permitting the vehicles to be loaded and unloaded, said tale gate being pivotally attached to the rear end of the trailer body so as to be rotatable about a horizontal axis and being operatively connected to the mechanism for imparting the pivotal movement to the top ramp, whereby when said mechanism is operated the tale gate is arranged to be imparted pivotal movement synchronously with said top ramp.

4. A remotely controllable toy transporter as set forth in claim 3, wherein the tale gate is formed with means for securely holding the top ramp at a certain height, said holding means being arranged to be engaged with the rear end of the top ramp when the tale gate assumes a substantially upright position by being rotated and the top ramp is raised to a certain height by being rotated.

5. A remotely controllable toy transporter as set forth in claim 1, wherein the tractor trailer unit further comprises a reversible motor disposed within its body and electrically connected to the remote-control device through connecting leads, a driving wheel assembly on said body and a gear arrangement disposed within said body and operatively connecting the reversible motor with the driving wheel assembly, whereby when the motor is selectively rotated in one rotational direction or the other by manipulation of the remote-control device the tractor trailer unit is caused to travel forward or backward.

6. A remotely controllable toy transporter as set forth in claim 1, wherein the tractor trailer unit further comprises a reversible motor disposed within its body and electrically connected to the remote-control device through connecting leads, a steering mechanism mounted in said body and a gear arrangement disposed within said body and operatively connecting the motor with the steering mechanism, said steering mechanism being arranged to steer the tractor trailer unit either right or left according to the direction of rotation of said motor, whereby when the motor is selectively rotated in one rotational direction or the other by manipulation of the remote-control device the tractor trailer unit is caused to travel right or left.

7. A remotely controllable toy transporter as set forth in claim 2, wherein the manually operable remote-control device includes two push-button switches for actuating the reversible motor, one of said switches being operative for causing a polarity reversal of the current supplied to the motor, whereby when the push-button of the switch is depressed the direction of rotation of the motor is reversed.

8. A remotely controllable toy transporter as set forth in claim 5, wherein the manually operable remote-control device includes two push-button switches in circuit with the reversible motor for driving the tractor trailer unit forward and backward, one of said switches being operative for causing a polarity reversal of the current supplied to said motor, whereby when the push-buttons of the switches are alternately depressed the direction of rotation of said motor is alternately changed to cause the running direction of said tractor to be reversed.

9. A remotely controllable toy transporter as set forth in claim 6, wherein the manually operable remote-control device includes two push-button switches in circuit with the reversible motor for operating the steering mechanism, one of said switches being operative for causing a polarity reversal of the current supplied to said motor, whereby when the push-buttons of the switches are alternately depressed the direction of rotation of said motor is alternately changed to cause the running direction of said tractor to be changed right and left.

* * * * *